(12) United States Patent
Tashima et al.

(10) Patent No.: US 11,274,555 B2
(45) Date of Patent: Mar. 15, 2022

(54) TURBINE ROTOR

(71) Applicant: TOSHIBA ENERGY SYSTEMS & SOLUTIONS CORPORATION, Kawasaki (JP)

(72) Inventors: Tsuguhisa Tashima, Yokohama Kanagawa (JP); Takahiro Ono, Ota Tokyo (JP); Shogo Iwai, Ota Tokyo (JP); Yoshifumi Iwasaki, Yokohama Kanagawa (JP); Norikazu Takagi, Kawasaki Kanagawa (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/104,352

(22) Filed: Nov. 25, 2020

(65) Prior Publication Data

US 2021/0172321 A1 Jun. 10, 2021

(30) Foreign Application Priority Data

Dec. 10, 2019 (JP) .............................. JP2019-223315

(51) Int. Cl.
*F01D 5/08* (2006.01)
(52) U.S. Cl.
CPC .......... *F01D 5/085* (2013.01); *F05D 2220/30* (2013.01); *F05D 2240/24* (2013.01); *F05D 2260/221* (2013.01)
(58) Field of Classification Search
None
See application file for complete search history.

(56) References Cited

U.S. PATENT DOCUMENTS

| | | | | |
|---|---|---|---|---|
| 5,593,274 A | * | 1/1997 | Carreno | F01D 5/081 285/300 |
| 5,967,743 A | * | 10/1999 | Meylan | F04D 29/582 415/115 |
| 6,048,169 A | * | 4/2000 | Feldmuller | F01D 3/02 415/115 |
| 6,053,701 A | * | 4/2000 | Ichiryu | F01D 5/084 415/115 |

(Continued)

FOREIGN PATENT DOCUMENTS

| | | |
|---|---|---|
| CN | 106574556 A | 4/2017 |
| EP | 2 687 680 A2 | 1/2014 |

(Continued)

*Primary Examiner* — Michael Lebentritt
(74) *Attorney, Agent, or Firm* — Foley & Lardner LLP (57) ABSTRACT

A turbine rotor of an embodiment includes a rotor body portion having turbine discs in plural stages in an axial direction protruding radially outside from an outer peripheral surface of the rotor body portion over a circumferential direction. The turbine rotor includes a plurality of axial passages, through which a cooling medium flows, formed at the rotor body portion radially outside than a center axis of the turbine rotor and radially inside than an outer peripheral surface of the rotor body portion in the axial direction; an introduction passage introducing the cooling medium into each of the axial passages; and discharge passages that penetrate from each of the axial passages to the outer peripheral surface of the rotor body portion to discharge the cooling medium.

6 Claims, 4 Drawing Sheets

(56) References Cited

U.S. PATENT DOCUMENTS

| | | | | |
|---|---|---|---|---|
| 6,094,905 | A * | 8/2000 | Fukuyama | F01D 5/082 |
| | | | | 60/806 |
| 6,293,089 | B1 * | 9/2001 | Sasaki | F02C 7/18 |
| | | | | 60/806 |
| 6,450,758 | B1 * | 9/2002 | Schmidt | F01D 5/084 |
| | | | | 415/115 |
| 7,114,915 | B2 * | 10/2006 | Uematsu | F01D 5/084 |
| | | | | 415/115 |
| 2001/0006601 | A1 * | 7/2001 | Wilson | F01D 5/085 |
| | | | | 416/95 |
| 2010/0034641 | A1 * | 2/2010 | Ikeda | F01D 25/26 |
| | | | | 415/116 |
| 2017/0234135 | A1 | 8/2017 | Takamura et al. | |

FOREIGN PATENT DOCUMENTS

| | | |
|---|---|---|
| JP | H10-252403 A | 9/1998 |
| JP | 2013-19284 A | 1/2013 |

* cited by examiner

TURBINE ROTOR

CROSS-REFERENCE TO RELATED APPLICATIONS

This application is based upon and claims the benefit of priority from Japanese Patent Application No. 2019-223315, filed on Dec. 10, 2019; the entire contents of which are incorporated herein by reference.

FIELD

Embodiments described herein relate generally to a turbine rotor.

BACKGROUND

In recent years, efforts have been made to improve performance of turbines to improve power generation efficiency of power plants. To improve the performance of the turbines, a temperature at a turbine inlet tends to be higher.

With the high turbine inlet temperature, it is necessary to keep materials used for a turbine structure at an appropriate temperature. Therefore, the turbine structures such as a turbine rotor, rotor blades, and stator blades are cooled by introducing a cooling medium.

Power plants are also increasing in power output. As a result, a diameter of the turbine rotor tends to be larger. Besides, the rotor blades and stator blades tend to be longer.

Figure 3:
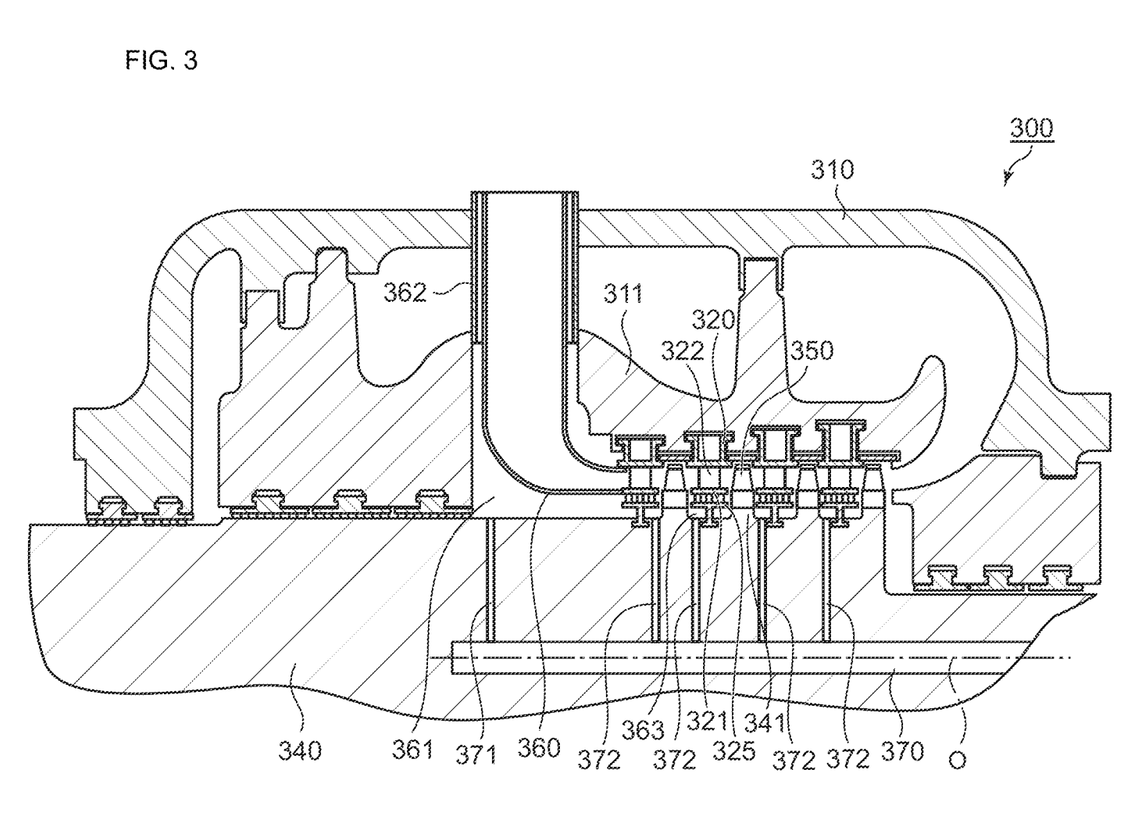
FIG. 3 is a diagram illustrating a meridian cross-section of a conventional axial flow turbine.

FIG. 3 is a diagram illustrating a meridian cross-section of a conventional axial flow turbine 300. FIG. 3 illustrates a turbine structure of a gas turbine.

As illustrated in FIG. 3, the conventional axial flow turbine 300 includes an outer casing 310 and an inner casing 311 inside the outer casing 310. A turbine rotor 340 is provided through the inner casing 311 and the outer casing 310.

An outer shroud 320 is provided on an inner periphery of the inner casing 311 over a circumferential direction. An inner shroud 321 is provided inside the outer shroud 320 over the circumferential direction. A plurality of stator blades 322 are supported between the outer shroud 320 and the inner shroud 321 in the circumferential direction to form a stator blade cascade.

Here, the circumferential direction is a circumferential direction around a center axis O of the turbine rotor, that is, around an axis of the center axis O.

Inside the inner shroud 321, a heat shield piece 325 is provided over the circumferential direction opposite the inner shroud 321. A sealing portion is formed between the inner shroud 321 and the heat shield piece 325. The heat shield piece 325 is implanted in the turbine rotor 340.

The turbine rotor 340 includes turbine discs 341 protruding radially outside over the circumferential direction. The turbine discs 341 are provided in plural stages in a center axis direction of the turbine rotor 340. A plurality of rotor blades 350 are implanted in each turbine disc 341 in the circumferential direction to form a rotor blade cascade. The center axis direction of the turbine rotor is hereinafter simply referred to as an axial direction.

The stator blade cascade and the rotor blade cascade are alternately provided in the turbine rotor axial direction. A turbine stage is formed by the stator blade cascade and the rotor blade cascade which is directly downstream of the stator blade cascade. The "downstream" means a downstream side with respect to a mainstream flow direction of a working fluid.

As illustrated in FIG. 3, a transition piece 360, which leads combustion gas produced in a combustor (not shown) to first-stage stator blades 322, is provided through the outer casing 310 and the inner casing 311.

In the conventional axial flow turbine 300, a cooling medium is introduced to cool the turbine rotor 340.

A center passage 370 is formed at the center of the turbine rotor 340, through which the cooling medium flows in the axial direction. The center passage 370 whose center axis is the center axis O of the turbine rotor 340 is extended in the axial direction, as illustrated in FIG. 3.

The turbine rotor 340 is also provided with an introduction passage 371 that leads the cooling medium supplied to a space 361 in the inner casing 311 into the center passage 370. The cooling medium is introduced into the space 361 from around the transition piece 360 through a cooling medium supply pipe 362. The introduction passage 371 is formed in a radial direction and is connected to an upstream portion of the center passage 370.

The radial direction is a direction perpendicular to the center axis O, with the center axis O as a base point. The "upstream" means an upstream side with respect to the mainstream flow direction of the working fluid.

The turbine rotor 340 is provided with discharge passages 372 in a space 363 between the heat shield piece 325 and the turbine rotor 340 to discharge the cooling medium flowing through the center passage 370. The discharge passage 372 is formed in the radial direction and is connected to the center passage 370. A plurality of discharge passages 372 are provided in the axial direction to allow the cooling medium to be discharged into the space 363 of each turbine stage.

Here, the cooling medium supplied to the space 361 from the cooling medium supply pipe 362 is led through the introduction passage 371 to the center passage 370. The cooling medium flowing through the center passage 370 is then discharged into the space 363 through the discharge passage 372.

Since the turbine rotor 340 is a structure that rotates at high speed, various stresses are generated at different portions of the turbine rotor 340. Therefore, it is important to design the turbine rotor so that these stresses are each within an acceptable range.

Figure 4:
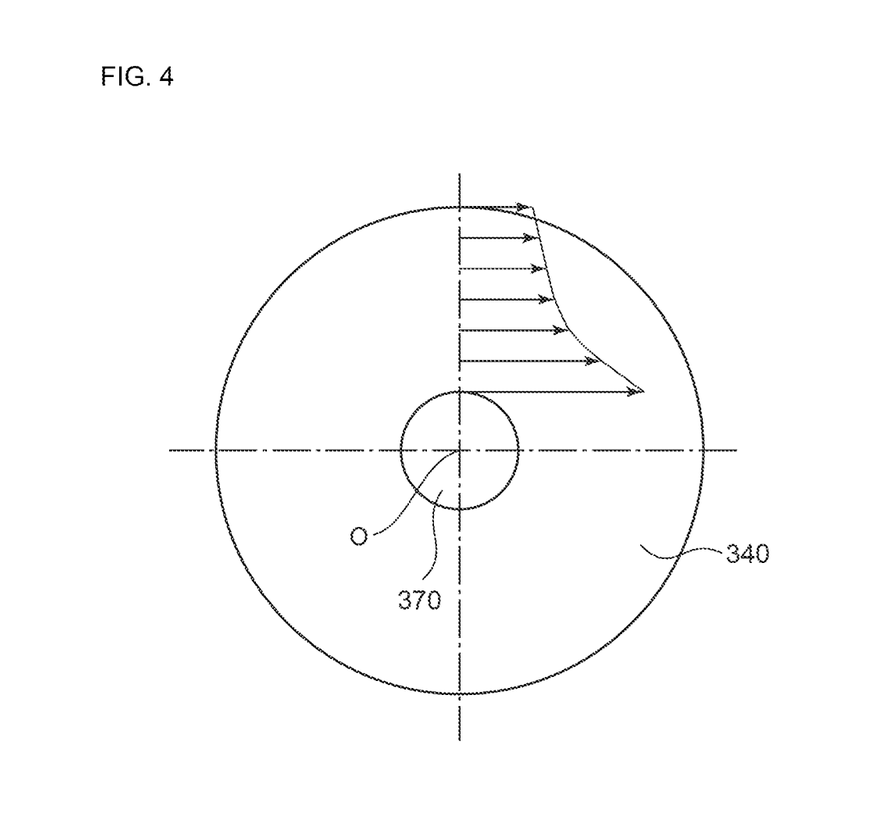
FIG. 4 is a diagram schematically illustrating tangential stresses (shear stresses) in the conventional turbine rotor.

FIG. 4 is a diagram schematically illustrating tangential stresses (shear stresses) in the conventional turbine rotor 340. FIG. 4 illustrates the tangential stresses in a cross-section perpendicular to the center axis O. In FIG. 4, the magnitude of the tangential stress is indicated by a length of an arrow.

As illustrated in FIG. 4, the conventional turbine rotor 340 has the center passage 370 whose center axis is the center axis O. The tangential stress is the largest at an inner wall portion of the center passage 370. The tangential stress decreases as going radially outside.

As mentioned above, it is necessary to increase the diameter of the turbine rotor to ensure stiffness of the turbine rotor in order to ensure rotor-shaft system stability in the axial flow turbine where high output is required.

However, as can be seen from the tangential stresses illustrated in FIG. 4, when a diameter of the center passage 370 is the same, the tangential stress at the inner wall portion of the center passage 370 increases as the turbine rotor diameter is increased. Therefore, the turbine rotor 340 with the center passage 370 whose center axis is the center axis O cannot ensure the stiffness of the turbine rotor due to the increase of the turbine rotor diameter. This reduces reliability of the axial flow turbine.

DETAILED DESCRIPTION

Hereinafter, embodiments of the present invention will be described with reference to the drawings.

In one embodiment, a turbine rotor includes a rotor body portion having turbine discs protruding radially outside over a circumferential direction in plural stages in a center axis direction of the turbine rotor.

The turbine rotor also includes a plurality of axial passages. through which a cooling medium flows, formed radially outside than a center axis of the turbine rotor of the rotor body portion and radially inside than an outer peripheral surface of the rotor body portion in the center axis direction of the turbine rotor, an introduction passage for introducing the cooling medium into each of the axial passages, and discharge passages penetrating from each of the axial passages to the outer peripheral surface of the rotor body portion to discharge the cooling medium.

Figure 1:
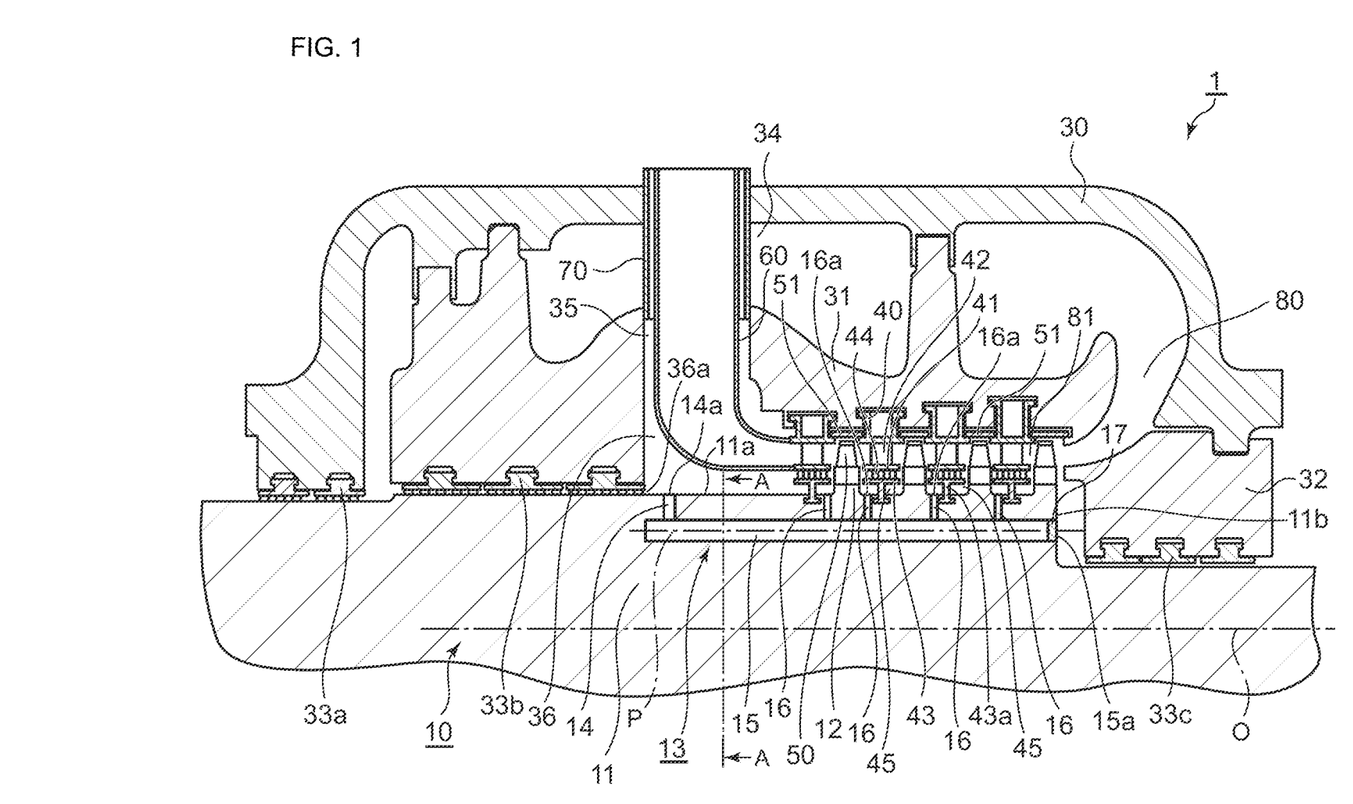
FIG. 1 is a diagram illustrating a meridian cross-section of an axial flow turbine with a turbine rotor according to an embodiment.

FIG. 1 is a diagram illustrating a meridian cross-section of an axial flow turbine 1 provided with a turbine rotor 10 according to an embodiment. FIG. 1 illustrates a turbine structure of a gas turbine.

As illustrated in FIG. 1, the axial flow turbine 1 includes an outer casing 30 and an inner casing 31 inside the outer casing 30. The turbine rotor 10 is provided through the inner casing 31 and the outer casing 30.

An outer shroud 40 is provided on an inner periphery of the inner casing 31 over the circumferential direction. Inside the outer shroud 40 (radially inside), an inner shroud 41 is provided over the circumferential direction. A plurality of stator blades 42 are supported between the outer shroud 40 and the inner shroud 41 in the circumferential direction to form a stator blade cascade. The stator blade cascades are provided in plural stages in an axial direction (in a direction of a center axis O of the turbine rotor 10).

Here, the radially inside is a side that approaches the center axis O in a radial direction (the center axis O side).

A heat shield piece 43 is provided on the inside of the inner shroud 41 over the circumferential direction opposite the inner shroud 41. The heat shield piece 43 is, for example, implanted in the turbine rotor 10. A sealing portion 44 is formed between the inner shroud 41 and the heat shield piece 43.

The turbine rotor 10 includes a rotor body portion 11, turbine discs 12, and a cooling structure portion 13.

The rotor body portion 11 is constituted by a cylindrical member. Both ends of the rotor body portion 11 are rotatably supported by bearings (not shown).

The turbine discs 12 protrude radially outside from an outer peripheral surface of the rotor body portion 11 over the circumferential direction. The turbine discs 12 each constituted by this annular protrusion are provided in plural stages in the axial direction. Here, the radially outside is a side away from the center axis O in the radial direction.

A plurality of rotor blades 50 are implanted in the circumferential direction at a tip portion of each turbine disc 12 to form a rotor blade cascade. An outer periphery of the rotor blade 50 is surrounded by, for example, a shroud segment 51. The shroud segment 51 is supported by the outer shroud 40.

The stator blade cascades and rotor blade cascades are provided alternately in the axial direction. A turbine stage is constituted by the stator blade cascade and the rotor blade cascade which is directly downstream of the stator blade cascade.

As illustrated in FIG. 1, there are gland sealing portions 33a, 33b, and 33c that inhibit leakage of a working fluid to the outside between the turbine rotor 10 and the inner casing 31, between the turbine rotor 10 and the outer casing 30, and between the turbine rotor 10 and a packing head 32.

The cooling structure 13 has a structure for cooling the turbine rotor 10 by the cooling medium. This structure will be described in detail later.

The turbine rotor 10 may, for example, be a monoblock type rotor constituting the entire turbine rotor 10 integrally. In this case, the turbine rotor 10 is an integral-type forged product.

The turbine rotor 10 may, for example, be a joined rotor formed by joining a plurality of turbine rotor components. The joined rotor is constituted by joining the turbine rotor components by, for example, welding, friction welding, or the like, in the axial direction.

Here, the axial flow turbine 1 is provided with a transition piece 60 through the outer casing 30 and the inner casing 31. A downstream end of the transition piece 60 is in contact with upstream ends of the inner shroud 41 and the outer shroud 40, which support first-stage stator blades 42. The transition piece 60 leads combustion gas produced by a combustor (not shown) to the first-stage stator blades 42.

In a penetration region where the transition piece 60 penetrates the outer casing 30 and the inner casing 31, an outer periphery of the transition piece 60 is covered with a cooling medium supply pipe 70 for introducing the cooling medium. That is, in the penetration region, a double-pipe structure formed by the transition piece 60 and the cooling medium supply pipe 70 provided on an outer peripheral side of the transition piece 60 is included.

To prevent the cooling medium flowing through an annular passage between the transition piece 60 and the cooling medium supply pipe 70 from flowing into a space 34 between the outer casing 30 and the inner casing 31, a downstream end of the cooling medium supply pipe 70 is extended into a through hole 35 formed at the inner casing 31. The through hole 35 is an opening for penetrating the transition piece 60 and the cooling medium supply pipe 70 into the inner casing 31.

An outlet of the cooling medium supply pipe 70 is connected to a space 36 in the inner casing 31 in which the transition piece 60 is inserted. That is, the cooling medium introduced from the cooling medium supply pipe 70 flows into the space 36.

A configuration for supplying the cooling medium to the space 36 is not limited to this configuration. That is, the cooling medium supply pipe 70 is not limited to a configuration provided around the transition piece 60. The cooling medium supply pipe 70 may have a configuration that can supply the cooling medium to the space 36 through the outer casing 30 and the inner casing 31, for example.

Next, the cooling structure portion 13 of the turbine rotor 10 will be described in detail.

Figure 2:
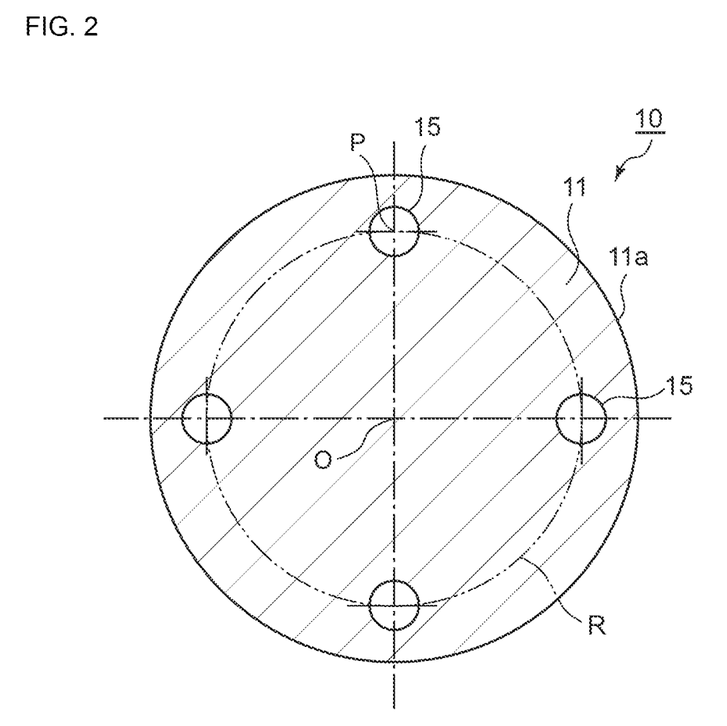
FIG. 2 is a diagram illustrating an A-A cross-section of FIG. 1.

FIG. 2 is a diagram illustrating an A-A cross-section of FIG. 1. FIG. 2 illustrates a cross-section perpendicular to the center axis O of the turbine rotor 10. The explanation will be described here with reference to FIG. 1 and FIG. 2.

As illustrated in FIG. 1, the cooling structure portion 13 includes an introduction passage 14, axial passages 15, and discharge passages 16. The introduction passage 14, the axial passages 15, and the discharge passages 16 are connected.

The introduction passage 14 is constituted by, for example, a through hole penetrating from an outer peripheral surface 11a of the rotor body portion 11 to the axial passage 15. The introduction passage 14 is formed, for example, in the radial direction.

The introduction passage 14 may be formed to have a slope in the axial direction with respect to the radial direction. The introduction passage 14 may be formed to have a slope in the circumferential direction with respect to the radial direction.

An inlet 14a of the introduction passage 14 opens into the space 36 in the inner casing 31 into which the cooling medium is introduced. That is, the space 36 and the axial passage 15 are connected through the introduction passage 14.

A plurality of introduction passages 14 may, for example, be provided in the axial direction. In this case, the cooling medium introduced into the space 36 flows through the plurality of introduction passages 14 to the axial passages 15.

As illustrated in FIG. 1 and FIG. 2, the axial passage 15 is formed in the axial direction at the rotor body portion 11, radially outside than the center axis O of the turbine rotor 10 and radially inside than the outer peripheral surface 11a of the rotor body portion 11. That is, the axial passage 15 is formed between the center axis O and the outer peripheral surface 11a of the rotor body portion 11. The center axis O is not included in the axial passage 15. The axial passage 15 is constituted by, for example, a hole with a circular cross-section.

The axial passage 15 is formed parallel to the center axis O of the turbine rotor 10, as illustrated in FIG. 1.

A plurality of axial passages 15 are provided, for example. In this case, the plurality of axial passages 15 of the same shape are provided. As illustrated in FIG. 2, the axial passages 15 are evenly arranged on the same circumference R around the center axis O. In other words, in the cross-section illustrated in FIG. 2, a center axis P of each axial passage 15 is located on the same circumference R around the center axis O, and a length in the circumferential direction between the center axes P of each of the axial passages 15 is equal. FIG. 2 illustrates an example of including four axial passages 15, but the number of the axial passages 15 is not limited thereto. The axial passages 15 serve as long as they are provided in plural. That is, the cooling structure portion 13 is provided with two or more axial passages 15.

By arranging the plurality of axial passages 15 evenly on the same circumference R, rotor-shaft system stability can be ensured when the turbine rotor 10 rotates.

The axial passages 15 are formed, for example, from a position in the axial direction corresponding to an upstream end 36a of the space 36 in the inner casing 31 into which the cooling medium is introduced, to a position in the axial direction corresponding to an outlet of a final turbine stage. Here, the axial passage 15 is formed from the position in the axial direction corresponding to the upstream end 36a of the space 36 to a downstream end 11b, opposite the packing head 32, where a turbine rotor diameter is reduced, and penetrates the downstream end 11b. In this case, an outlet 15a of the axial passage 15 is sealed with a sealing member 17.

Here, for example, when the turbine rotor 10 is constituted by a joined rotor, the axial passage 15 does not have to be configured to penetrate toward a downstream side as illustrated in FIG. 1. In this case, the axial passage 15 can be configured, for example, by drilling from a joint end side of the turbine rotor components toward the final turbine stage side. This allows the axial passage 15 to be formed without penetrating the downstream end 11b. Therefore, the sealing member 17 is no longer necessary.

A range in the axial direction where the axial passages 15 are formed is not limited thereto. The axial passages 15 are necessary to be formed within a range capable of introducing the cooling medium from the introduction passage 14 and leading to the respective discharge passages 16.

The axial passages 15 are preferably formed at least in a range in the axial direction corresponding to the outer peripheral surface 11a of the turbine rotor 10 that is exposed to high-temperature combustion gas introduced from the transition piece 60. Concretely, the axial passages 15 are preferably formed from at least a position in the axial direction corresponding to a first turbine stage to a position in the axial direction corresponding to the outlet of the final turbine stage.

The axial passage 15 may be extended to a position in the axial direction where the gland sealing portion 33b provided at the inner casing 31 is located.

The discharge passage 16 is constituted by a through hole penetrating from the axial passage 15 to the outer peripheral surface 11a of the rotor body portion 11. Concretely, as illustrated in FIG. 1, the discharge passage 16 connects the axial passage 15 with a space 45 between the heat shield piece 43 and the outer peripheral surface 11a.

A plurality of discharge passages 16 are provided in the axial direction in accordance with respective turbine stages. In other words, the discharge passages 16 have outlets 16a at the outer peripheral surface 11a of the rotor body portion 11 on an upstream side of a first-stage turbine disc 12 and at the outer peripheral surface 11a of the rotor body portion 11 between the respective turbine discs 12.

For example, in the first turbine stage, the outlet 16a of the discharge passage 16 opens into the space 45 surrounded by the heat shield piece 43, the outer peripheral surface 11a, and the first-stage turbine disc 12.

In the second and subsequent turbine stages, the outlet 16a of the discharge passage 16 opens into the space 45 surrounded by the upstream and downstream turbine discs 12, the heat shield piece 43, and the outer peripheral surface 11a.

In the second and subsequent turbine stages, an example where the outlet 16a of the discharge passage 16 is located on the upstream turbine disc 12 side is shown. In the second and subsequent turbine stages, the outlet 16a of the discharge passage 16 may be located on the downstream turbine disc 12 side.

The discharge passage 16 is formed, for example, in the radial direction. The discharge passage 16 may be formed to have a slope in the axial direction with respect to the radial direction. The discharge passage 16 may be formed to have a slope in the circumferential direction with respect to the radial direction.

Here, the introduction passage 14 and the discharge passage 16 are formed at each axial passage 15, respectively.

Here, for example, a part of the working fluid of the gas turbine can be used as the cooling medium by adjusting a temperature thereof. That is, the working fluid that has been extracted from a gas turbine system and adjusted to a predetermined temperature can be used as the cooling medium.

For example, when the gas turbine is a supercritical $CO_2$ turbine, $CO_2$, which is the working fluid, is used as the cooling medium. The supercritical $CO_2$ turbine is equipped with a configuration in which a part of $CO_2$, which is the combustion product, is circulated at a supercritical pressure to a combustor. In the case of a typical gas turbine, air, or the like, extracted from a compressor, for example, is used as the cooling medium.

Next, operation of the axial flow turbine 1 and the cooling structure portion 13 of the turbine rotor 10 will be described with reference to FIG. 1.

First, the operation of the axial flow turbine 1 will be described.

The combustion gas produced in the combustor (not shown) is introduced through the transition piece 60 into the axial flow turbine 1. The combustion gas introduced into the axial flow turbine 1 is led to the first-stage stator blades 42. The combustion gas is then ejected from the first-stage stator blades 42 toward first-stage rotor blades 50.

In this way, the combustion gas flows through a combustion gas flow path 81 provided with the second and subsequent stages of stator blades 42 and rotor blades 50 to rotate the turbine rotor 10 while doing expansion work. The combustion gas that passes through final-stage rotor blades 50 is discharged from the axial flow turbine 1 through an exhaust flow path 80.

Next, the operation of the cooling structure portion 13 of the turbine rotor 10 will be described.

The cooling medium is led through the cooling medium supply pipe 70 into the space 36 in the inner casing 31 in which the transition piece 60 is inserted. In this case, the cooling medium is led into the space 36 through an annular passage between the transition piece 60 and the cooling medium supply pipe 70. When equipped with this configuration, the transition piece 60 is cooled by the cooling medium.

Here, the outer peripheral surface 11a of the rotor body portion 11 is cooled by the cooling medium introduced into the space 36. A pressure of the cooling medium introduced into the space 36 is higher than the pressure of the combustion gas ejected from the transition piece 60.

A part of the cooling medium led into the space 36 flows into the introduction passage 14 from the inlet 14a. The cooling medium that flows into the introduction passage 14 flows through the introduction passage 14 into the axial passage 15. A flow rate of the cooling medium led to the axial passage 15 is adjusted by, for example, a diameter of the introduction passage 14.

The cooling medium led to the axial passage 15 flows down the axial passage 15 toward a downstream side of the axial direction. The cooling medium flowing down the axial passage 15 toward the downstream side of the axial direction flows into each discharge passage 16 formed to correspond to each turbine stage.

The cooling medium flowing into the discharge passage 16 passes through the discharge passage 16 and is ejected from the outlet 16a into the space 45 between the heat shield piece 43 in each turbine stage and the outer peripheral surface 11a.

The flow rate of the cooling medium led to each discharge passage 16 is adjusted by, for example, a diameter, or the like of each discharge passage 16. In other words, an ejection pressure when ejecting the cooling medium from the outlet 16a of each discharge passage 16 into the space 45 is adjusted by, for example, the diameter, or the like, of each discharge passage 16.

A pressure of the cooling medium discharged from the discharge passage 16 will be higher than the pressure in the space 45.

Here, the rotor body portion 11 (turbine rotor 10) is cooled from the inside by passing the cooling medium through the introduction passage 14, the axial passage 15, and the discharge passage 16.

The cooling medium ejected into the space 45 on the upstream turbine disc 12 side also spreads to the downstream turbine disc 12 side, for example, through a gap in the circumferential direction of a support member 43a supporting the heat shield piece 43. The cooling medium then spreads throughout the space 45.

The cooling medium spread throughout the space 45 then flows into the combustion gas flow path 81 through a gap between the heat shield piece 43 and the turbine disc 12 and a gap between the inner shroud 41 and the turbine disc 12. The cooling medium that flows into the combustion gas flow path 81 flows through the combustion gas flow path 81 with the combustion gas and is discharged into the exhaust flow path 80.

Here, the outer peripheral surface 11a of the rotor body portion 11 and the turbine disc 12 facing the space 45 are cooled by the cooling medium flowing into the space 45 and by the cooling medium flowing out into the combustion gas flow path 81.

On the other hand, a part of the cooling medium led into the space 36 flows into the outer shroud 40 and the sealing portion 44. Concretely, the cooling medium flows toward a downstream side through the sealing portion 44 between the inner shroud 41 and the heat shield piece 43. The cooling medium is also led into the outer shroud 40 and is used to cool the stator blades 42. A part of the cooling medium led into the space 36 flows into the gland sealing portions 33b and 33a.

According to the turbine rotor 10 in the above-described embodiment, the axial passage 15 is formed between the center axis O and the outer peripheral surface 11a of the rotor body portion 11. That is, the axial passage 15 is formed on the outer peripheral surface 11a side than the center axis O.

Therefore, as can be seen by referring to the tangential stresses illustrated in FIG. 4, the turbine rotor 10 in the embodiment can reduce the tangential stress (shear stress) generated at the inner wall portion of the axial passage 15 compared to the turbine rotor having the axial passage centered on the center axis O.

This allows the turbine rotor 10 to be cooled while maintaining the strength of the turbine rotor 10.

In the cross-section of the turbine rotor 10 perpendicular to the center axis O, the plurality of axial passages 15 are evenly arranged on the same circumference around the center axis O to ensure rotor-shaft system stability.

In the above-described embodiment, an example of a unidirectional flow turbine configuration in which combustion gas ejected from the transition piece 60 flows in one direction has been illustrated as the axial flow turbine 1. However, the configuration of the axial flow turbine 1 is not limited to this configuration.

The configuration of the axial flow turbine 1 may be a counterflow turbine configuration in which combustion gas is ejected out of the transition piece 60 to the left and right.

In this configuration, the turbine stages are provided in one axial direction and the other axial direction opposite thereto where the combustion gas is ejected, respectively. In this configuration, the same operation and effect as in the axial flow turbine 1 described above can be achieved.

An example of the axial flow turbine 1 including the heat shield piece 43 inside the inner shroud 41 is illustrated, but the configuration is not limited thereto.

For example, the heat shield piece 43 may not be provided inside the inner shroud 41. In this case, the sealing portion is provided between the inner shroud 41 and the outer peripheral surface 11a of the rotor body portion 11.

In the first-stage turbine stage, the space 45 where the cooling medium is ejected from the outlet 16a of the discharge passage 16 is surrounded by the sealing portion, the outer peripheral surface 11a, the inner shroud 41, and the first-stage turbine disc 12. The outlet 16a of the discharge passage 16 opens, for example, into the outer peripheral surface 11a between the sealing portion and the first-stage turbine disc 12.

In the second and subsequent turbine stages, the space 45 is surrounded by the upstream and downstream turbine discs 12, the outer peripheral surface 11a, and the inner shroud 41. The outlet 16a of the discharge passage 16 opens, for example, into the outer peripheral surface 11a between the upstream turbine disc 12 and the sealing portion, or into the outer peripheral surface 11a between the downstream turbine disc 12 and the sealing portion.

According to the above-described embodiment, cooling by the cooling medium is possible while ensuring the rotor-shaft system stability and rotor strength.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

What is claimed is:

1. A turbine rotor, comprising:
a rotor body portion having turbine discs projecting radially outside over a circumferential direction in plural stages in a center axis direction of the turbine rotor;
a plurality of axial passages, through which a cooling medium flows, formed at the rotor body portion radially outside than a center axis of the turbine rotor and radially inside than an outer peripheral surface of the rotor body portion in the center axis direction of the turbine rotor;
an introduction passage introducing the cooling medium into each of the axial passages; and
discharge passages that penetrate from each of the axial passages to the outer peripheral surface of the rotor body portion to discharge the cooling medium.

2. The turbine rotor according to claim 1, wherein in a cross-section perpendicular to the center axis of the turbine rotor, the axial passages are evenly arranged on the same circumference around the center axis of the turbine rotor.

3. The turbine rotor according to claim 1, wherein the axial passage is formed parallel to the center axis of the turbine rotor.

4. The turbine rotor according to claim 1, wherein the discharge passage has outlets on the outer peripheral surface of the rotor body portion on an upstream side of a first-stage turbine disc and on the outer peripheral surface of the rotor body portion between each of the turbine discs.

5. The turbine rotor according to claim 1, wherein the turbine rotor is a monoblock rotor.

6. The turbine rotor according to claim 1, wherein the turbine rotor is a rotor formed by joining a plurality of turbine rotor components.

* * * * *